(12) United States Patent
Wang et al.

(10) Patent No.: US 11,734,614 B1
(45) Date of Patent: Aug. 22, 2023

(54) TRAINING SERVICE FOR AN AGGREGATED MACHINE LEARNING MODEL

(71) Applicant: Amazon Technologies, Inc., Seattle, WA (US)

(72) Inventors: Yi Wang, Sunnyvale, CA (US); Jiangtao Zhang, Pleasanton, CA (US)

(73) Assignee: Amazon Technologies, Inc., Seattle, WA (US)

(*) Notice: Subject to any disclaimer, the term of this patent is extended or adjusted under 35 U.S.C. 154(b) by 592 days.

(21) Appl. No.: 16/831,569

(22) Filed: Mar. 26, 2020

(51) Int. Cl.
*G06N 20/20* (2019.01)
*G06Q 30/016* (2023.01)
*G06N 5/04* (2023.01)

(52) U.S. Cl.
CPC .............. *G06N 20/20* (2019.01); *G06N 5/04* (2013.01); *G06Q 30/016* (2013.01)

(58) Field of Classification Search
CPC .......... G06N 3/00; G06N 20/00; G06Q 10/00; G06Q 50/00
USPC .............................. 705/7.11-7.42; 706/1-900
See application file for complete search history.

(56) References Cited

U.S. PATENT DOCUMENTS

| | | | | |
|---|---|---|---|---|
| 8,027,938 | B1* | 9/2011 | Xu et al. ............... | G06N 20/00 706/12 |
| 8,990,149 | B2* | 3/2015 | Danciu et al. ......... | G06Q 10/06 703/2 |
| 10,318,882 | B2* | 6/2019 | Brueckner et al. .... | G06N 20/00 |
| 10,360,482 | B1* | 7/2019 | Khare et al. ........... | G06N 3/04 |
| 10,402,723 | B1* | 9/2019 | Silberman et al. ..... | G06N 3/045 |
| 2015/0170053 | A1* | 6/2015 | Miao ..................... | G06N 20/00 706/12 |
| 2015/0356461 | A1* | 12/2015 | Vinyals et al. ......... | G06N 3/084 706/12 |
| 2015/0379424 | A1* | 12/2015 | Dirac et al. ............ | G06N 20/00 706/12 |
| 2016/0055426 | A1* | 2/2016 | Aminzadeh et al. ... | G06N 20/00 706/12 |
| 2016/0078361 | A1* | 3/2016 | Brueckner et al. .... | H04L 67/10 706/12 |
| 2017/0220949 | A1* | 8/2017 | Feng et al. ............. | H04L 41/16 |
| 2018/0018590 | A1* | 1/2018 | Szeto et al. ............ | G06N 20/10 |
| 2018/0374105 | A1* | 12/2018 | Azout et al. ............ | G06N 5/04 |
| 2019/0034830 | A1* | 1/2019 | Burangulov ........... | G06N 20/20 |
| 2019/0108417 | A1* | 4/2019 | Talagala et al. ........ | G06F 9/38 |
| 2019/0155633 | A1* | 5/2019 | Faulhaber, Jr. et al. | G06F 9/455 |
| 2019/0156244 | A1* | 5/2019 | Faulhaber, Jr. et al. ................... G06F 9/5072 |
| 2019/0156247 | A1* | 5/2019 | Faulhaber, Jr. et al. | G06N 20/00 |
| 2020/0034665 | A1* | 1/2020 | Ghanta et al. ......... | G06F 17/18 |
| 2020/0380310 | A1* | 12/2020 | Weider et al. ......... | G06F 18/2193 |
| 2021/0073672 | A1* | 3/2021 | Shi et al. ................ | G06F 17/16 |
| 2021/0141861 | A1* | 5/2021 | Kalluri .................. | G06F 40/30 |
| 2021/0174192 | A1* | 6/2021 | Zare et al. .............. | G06N 3/08 |

* cited by examiner

*Primary Examiner* — Alan S Miller
(74) *Attorney, Agent, or Firm* — NICHOLSON DE VOS WEBSTER & ELLIOTT LLP

(57) ABSTRACT

Techniques for creating an aggregated machine learning (ML) model from a plurality of candidate ML models are described. According to some embodiments, a machine learning service generates an aggregated machine learning model from a first machine learning model and a second machine learning model, selects the first machine learning model, the second machine learning model, or the aggregated machine learning model for usage, and performs an inference with the selected machine learning model. Additionally, a user may select the candidate models to be trained.

20 Claims, 8 Drawing Sheets

TRAINING SERVICE FOR AN AGGREGATED MACHINE LEARNING MODEL

BACKGROUND

Enterprises are generating more data than ever before. Trying to determine what data is relevant from that generated data is a non-trivial task. Traditionally, expertise in statistics and in artificial intelligence has been a prerequisite for developing and using machine learning models. For many business analysts and even for highly qualified subject matter experts, the difficulty of acquiring such expertise is sometimes too high a barrier to take full advantage of the large amounts of data potentially available to make improved business predictions and decisions.

BRIEF DESCRIPTION OF DRAWINGS

Various embodiments in accordance with the present disclosure will be described with reference to the drawings, in which.

DETAILED DESCRIPTION

Figure 1:
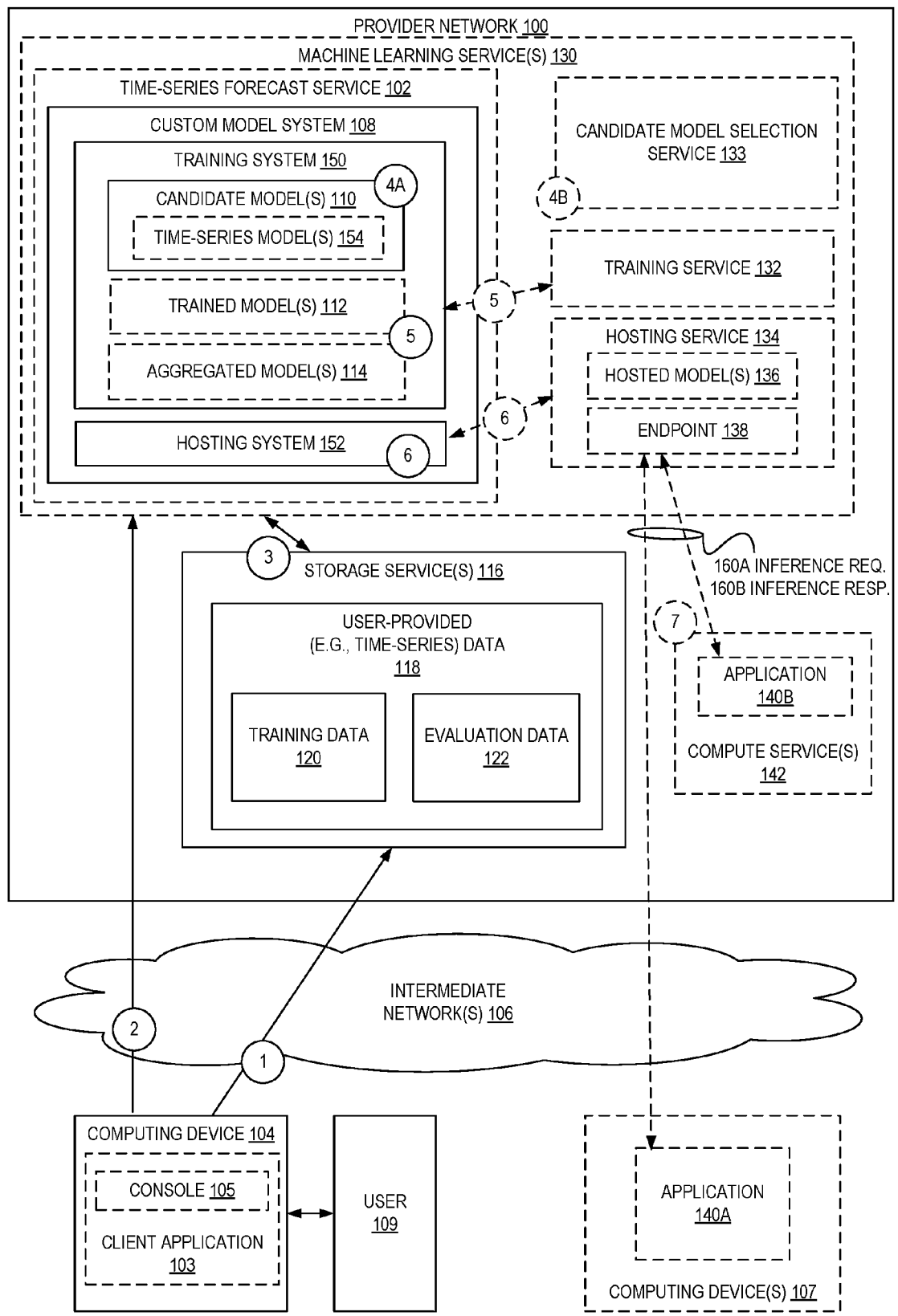
FIG. 1 is a diagram illustrating an environment for creating, training, and using an aggregated machine learning model according to some embodiments.

The present disclosure relates to methods, apparatus, systems, and non-transitory computer-readable storage media for creating an aggregated machine learning (ML) model. According to some embodiments, a machine learning service generates an aggregated ML model from a plurality of ML models. According to some embodiments, one or more candidate ML models are specified explicitly by a customer and/or are implicitly selected by the machine learning service (e.g., when a customer uses an automatic ML mode). In certain embodiments, each candidate ML model is trained to create a respective trained model, and each trained model is assigned a respective weight in the aggregated ML model. A weight service may utilize an error ratio for an input of an evaluation dataset to assign a respective weight for each model in an aggregated ML model. The machine learning service may then select an individual or aggregated ML model based at least in part on a respective error rate of each model. The selected ML model may be trained on evaluation data and training data. The selected model may then be utilized to perform an inference (e.g., on time-series data).

Certain embodiments herein provide for weighted training models prediction. In certain embodiments, a user is to split their input data into a training dataset and an evaluation (e.g., testing) dataset. A user and/or machine learning service may select one or more candidate algorithms for ML models and the machine learning service trains the candidate algorithms into candidate ML models with the training dataset and cross validates each model's accuracy with the evaluation dataset. A large number of algorithms (e.g., statistical based or recurrent neural network based) may be used to train a ML model, however, a customer may not know which model (e.g., algorithm) best fits for their use case or ML task. A machine learning service may include an automatic ML mode to select and train multiple ML models (e.g., and training algorithms) on the training data set and pick the best performance training model by checking the error ratio metrics during cross validation. The ML model may be a time-series forecasting ML model, for example, to predict a future event (e.g., point in a series) based on historical time-series data (e.g., past events) in a training dataset. Forecasting is useful in multiple domains, including, but not limited to, retail, financial planning, supply chain, and healthcare. A machine learning service may pick the best fitting (e.g., most accurate) model in its predictions, however, multiple models (e.g., algorithms) may perform substantially the same. Additionally or alternatively, there may be customers who want to select one or more candidate models for training and/or prediction. Further, a customer may have a lack of knowledge about machine learning and models, so they may prefer to have an automatic ML mode that selects the candidate models for training and/or prediction.

Certain embodiments herein provide for the aggregation of multiple candidate ML models, and the testing of the accuracy of the aggregated ML model's inference(s). In order to use multiple models (e.g., algorithms to predict future points), embodiments herein provide an efficient and suitable way to use individual, trained models, e.g., which are trained by different algorithms respectively. The training of a machine learning model may be the most time consuming (e.g., taking days of time) part of a machine learning operation. Thus, certain embodiments herein utilize more than one model (e.g., more than one algorithm) instead of only the best one. The multiple models (e.g., algorithms) may be specified explicitly by customer or implicitly selected by a machine learning service when a user (e.g., customer) uses automatic machine learning mode. In one embodiment, each model (e.g., training algorithm) is trained on a (e.g., user provided) training data set to generate a trained model.

Certain embodiments use an evaluation dataset to test if the model is performing as desired by comparing the predicted target(s) with the actual answer from the evaluation dataset. A number of evaluation metrics may be used to measure the predictive accuracy. The choice of these metrics may depend on different applications (e.g., ML tasks). In one embodiment, the machine learning service compare these selected metrics to each other to determine which models are performing as desired. Instead of using only one best model for the final prediction, certain embodiments herein aggregate a plurality of the models into an aggregate model, e.g., that outperforms any single model. In one embodiment, the machine learning service provides a weight (e.g., weight value) for each model to aggregate the models. The weight may be based on the performance (e.g., error rate or ratio). The weights may be selected to generate a more accurate final prediction in the future. In one weighted procedure, more weight is given to the observations with smaller variance and better performing models (e.g., algorithms) because these observations provide more reliable information about the model than those with large variances and under-fitting models. The single models and aggregated model(s) may then be compared to select one model therefrom for use. In one embodiment, the best performing model is an aggregated model.

FIG. 1 is a diagram illustrating an environment for creating, training, and using an aggregated machine learning model according to some embodiments. FIG. 1 includes a time-series forecast service 102, one or more storage services 116, one or more machine learning services 130, and one or more compute services 142 implemented within a multi-tenant provider network 100. Each of the time-series forecast service 102, one or more storage services 116, one or more machine learning services 130, and one or more compute services 142 may be implemented via software, hardware, or a combination of both, and may be implemented in a distributed manner using multiple different computing devices.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 142), a storage service 116 that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console 105 implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code - typically without the user having any control of or knowledge of the underlying compute instance(s) involved.

For example, in various embodiments, a "serverless" function may include code provided by a user or other entity – such as the provider network itself – that can be executed on demand. Serverless functions may be maintained within provider network 100 by an on-demand code execution service (which may be one of compute service(s) 142) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 140B) that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The time-series forecast service 102, in some embodiments, is a machine learning powered service that makes it easy for users to understand, find insights in, and identify probable future events in data. For example, users may use the time-series forecast service 102 to analyze historical time-series data, such as sales data, online traffic, etc. In some embodiments, the time-series forecast service 102 – via use of a custom model system 108 – allows users to build and use an aggregated model(s) 114 from trained model(s) 112. Although time-series data is one example where an inference may be performed, this disclosure is not limited to time-series data and time-series models 154.

The custom model system 108, for example, may enable users to generate trained models 112 from candidate models 110. As discussed further below, an aggregated model 114 may then be generated from a plurality of the trained models 112. Embodiments herein allow a customer to create trained models 112 and/or an aggregated model 114 by supplying data 118. This data 118 may include (e.g., labeled) training data 120 and evaluation data 122.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a plurality of candidate models 110 and respective configurations. Training may perform a grid search over the matrix of experiments (e.g., defined upfront) in search for the model and its parameters that performs best on the given dataset.

Thus, a user 109 may provide or otherwise identify data 118 (e.g., training data 120 and evaluation data 122) for use in creating a custom model. For example, as shown at circle (1), the user 109 may utilize a client application 103 executed by a computing device 104 (e.g., a web-application implementing a console 105 for the provider network 100, a standalone application, another web-application of another entity that utilizes the time-series forecast service 102 as a part of its backend, a database or mixed-SQL environment, etc.) to cause the computing device 104 to upload the data 118 to a storage location (e.g., provided by a storage service 116 such as an object storage service of a provider network 100).

The data 118 may be a columnar dataset that includes rows (or entries) of data values, where the data values may be arranged according to one or more columns (or attributes) and may be of a same datatype (e.g., one storing text). In some cases, the data 118 includes headings or other metadata describing names or datatypes of the columns, though in some cases this metadata may not exist. For example, some or all of the data 118 may have been provided by a user as a plaintext file (e.g., a comma-separated values (CSV) or tab-separated values (TSV) file), an exported database table or structure, an application-specific file such as a spreadsheet, etc.

For example, when a user 109 desires to train a classifier candidate model 110, this file (or files) may be a CSV with at least two values per row - e.g., one column storing documents (e.g., an amount of text ranging from a few characters to many words, sentences, paragraphs, etc.), and another column storing labels corresponding to the documents - e.g., "label,Text of document 1", where a label could be a valid UTF-8 string corresponding to a desired class to be detected.

Thereafter, at circle (2) the computing device 104 may issue one or more requests (e.g., API calls) to the machine learning service 130 that indicate the user's 109 desire to train a plurality of candidate models 110 into trained models 112, e.g., and create one or more aggregated models 114 from the trained models 112. The request may be of a type that identifies which type of models are to be created or identifies that the machine learning service 130 itself is to identify the candidate models 110. The request may also include one or more of an identifier of a storage location or locations storing the data 118 (e.g., an identifier of the training data 120 and evaluation data 122), which may identify a storage location (e.g., via a Uniform Resource Locator (URL), a bucket/folder identifier, etc.) within the provider network 100 (e.g., as offered by a storage service 116) or external to the provider network 100, a format identifier of the data 118, a language identifier of the language of the data 118, etc. In some embodiments, the request includes an identifier (e.g., from the user 109) of the candidate models 110 themselves within the request.

Responsive to receipt of the request, the custom model system 108 of the machine learning service 130 is invoked and begins operations for training the corresponding type of model. For example, the custom model system 108 may identify what type of model is to be trained (e.g., via analyzing the method call associated with the request), the storage location(s) associated with the data 120, 122, etc. Thus, the custom model system 108 may retrieve any stored data 118 elements as shown at circle (3), which may be from a storage location within the provider network 100 or external to the provider network 100.

In some embodiments, the training (at circle (4A)) of the candidate models 110 includes use (at optional, dotted circle (4B)) of a separate candidate model selection service 133 that selects a proper subset of candidate models from a plurality of candidate models 110 for training by training service 132 of machine learning service 130 described herein to perform a particular training job (e.g., hyperparameter optimization tuning job), or the like; similarly, the hosting system 152 of the custom model system 108 may make use (at optional, dotted circle (6)) of a hosting service 134 of a machine learning service 130 to deploy a model as a hosted model 136 in association with an endpoint 138 that can receive inference requests from client applications 140A and/or 140B at circle (7), provide the inference requests 160A to the associated hosted model(s) 136, and provide inference results 160B (e.g., predicted classes, predicted entities, predicted events, etc.) back to applications 140A and/or 140B, which may be executed by one or more computing devices 107 outside of the provider network 100 or by one or more computing devices of a compute service 142 (e.g., hardware virtualization service, serverless code execution service, etc.) within the provider network 100. Candidates model(s) 110 may include time-series model(s) 154.

Figure 2:
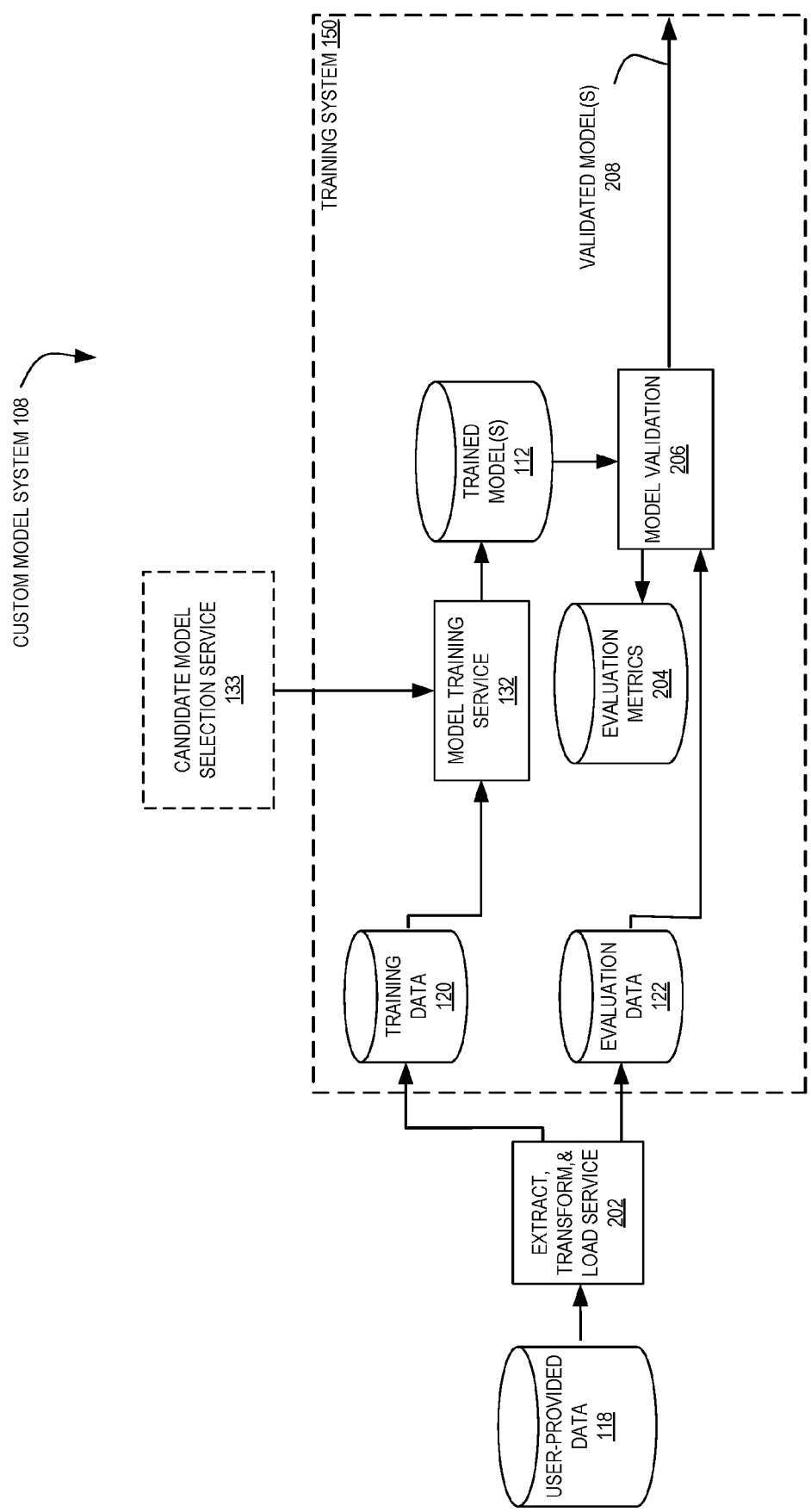
FIG. 2 is a diagram illustrating a custom model system that includes a model training service and model validation to create one or more validated models according to some embodiments.

FIG. 2 is a diagram illustrating a custom model system 108 that includes a model training service 132 and model validation 206 to create one or more validated models 208 according to some embodiments. Custom model system 108 includes a training system 150 to train one or more ML models, for example, to train a ML model as a text classifier for a particular user's domain (e.g., the documents within that domain) or to infer a future data point(s) based on a user's time-series (e.g., historical) data.

In FIG. 2, user-provided data 118 is accessed, and extract, transform, and load (ETL) service 202 performs ETL operations on the data 118, e.g., by searching the data, identifying data formats, and then suggesting schemas and transformations for the data (e.g., so that the data is in a desired format). In one embodiment, ETL service 202 outputs training data 120 and evaluation data 122. In FIG. 2, model training service 132 is to train one or more candidate models. In one embodiment, a user indicates one or more of a plurality of candidate models for training by model training service 132. Optionally, a user may indicate a request that the custom model system 108 is to determine one or more candidate models for training, e.g., determined by candidate model selection service 133. Candidate model selection service 133 may determine one or more candidate models based on the training data 120 that is provided. As an example, there may be three candidate models (model A, model B, and model C) that are trained and each stored into trained model(s) 112. Model validation 206 may be performed on the candidate models (e.g., model A, model B, and model C). In one embodiment, model validation 206 takes a known input from evaluation data 122, generates an inference based on that input, and compares the predicted data (e.g., output of the model) with the known (e.g., actual) data from evaluation data 122 for that input, and generates evaluation metrics 204. This model validation performed may be cross validation. The evaluation metrics may be an error ratio, e.g., the mean squared error, root mean squared error, mean absolute percentage error, etc.

In certain embodiments, model validation 206 is to select a proper subset of the trained models 112 to pass on as validated models 208. In one embodiment, training service 150 (e.g., in automatic ML mode) is to exclude models below a threshold (e.g., performance) value from being validated models 208. In one embodiment, training service 150 is to include any (e.g., explicitly) user specified models as validated models 208 (e.g., independent of the model's performance). Plurality of trained models (e.g., validated models 208) may then be used to form one or more aggregated models.

Figure 3:
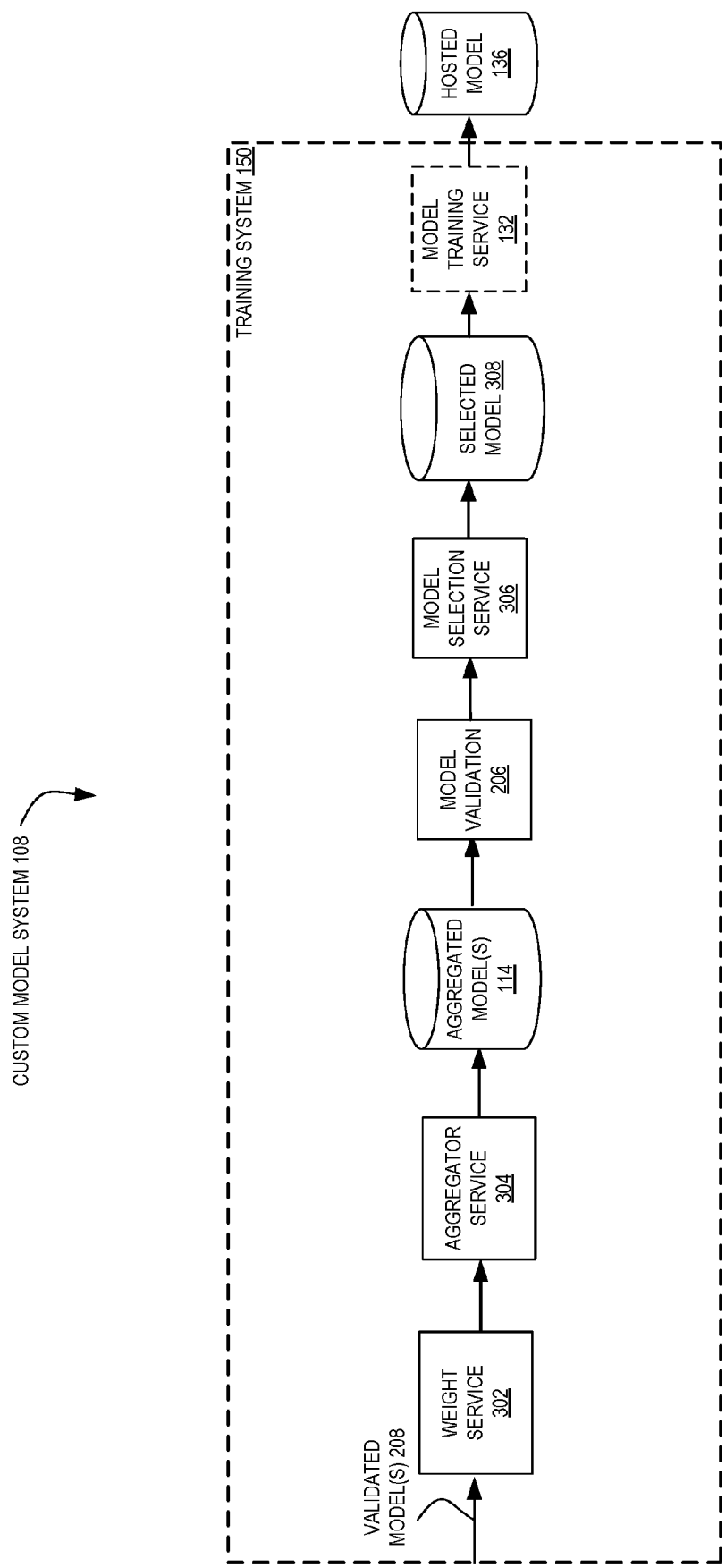
FIG. 3 is a diagram illustrating a custom model system that generates an aggregated machine learning model from a plurality of validated models according to some embodiments.

FIG. 3 is a diagram illustrating a custom model system 108 that generates an aggregated machine learning model 114 from a plurality of validated models 208 according to some embodiments. In FIG. 3, a plurality of validated models 208 are input into weight service 302, e.g., to be assigned a respective weight (W) for each of the models. In certain embodiments the weight service 302 is to generate a weight for each combination of the models. Using the models A, B, C example above, weight service is to generate one or more of: weights A and B for the aggregated model AB, weights B and C for the aggregated model BC, weights A and C for the aggregated model AC, and weights A, B, and C for the aggregated model ABC. In one embodiment, weight service 302 is to base the weights on the respective error rate (e.g., error ratio) for each individual model within an aggregated model, for example, by normalizing the error rate for each of the models within the aggregated model (e.g., such that the sum of the weights in each aggregated model are equal to one). Thus, in certain embodiments, the weights assigned to each individual model in an aggregated (e.g., combination) model are proportional to the error in the validation (e.g., cross validation) of each individual model.

Aggregator service 304 is then to generate an aggregated model 114 utilizing the weights. In one embodiment, aggregator service 304 is to filter out any model below a threshold performance level. Model validation 206 is then to validate the aggregated model(s) 114, e.g., on the evaluation data 122. In one embodiment, the model validation service 206 is to select a proper subset of the trained aggregated models 114 to pass on as validated model(s) to model selection service 306. In one embodiment, the model validation service 206 is to generate an error rate for each of the aggregated (and weighted) models. In one embodiment, the model selection service 306 of training system 150 then selects a model of the (e.g., validated by model validation service 206) aggregated models (e.g., models AB, BC, AC, and ABC) and (e.g., validated by model validation service 206) single models (e.g., models A, B, and C) as the selected model 308. In one embodiment, the selected model 308 is the model with the lowest error rate (e.g., ratio). In certain embodiments, the selected model 308 is a single model and not an aggregated model. In certain embodiments, the selected model 308 is an aggregated model and not a single model. In certain embodiments, the selected model 308 is then trained by model training service 132 with the training data 120 and/or evaluation data 122. For example, in one embodiment, if the selected model is aggregated model AB, training system 150 is to train model A on both the training data 120 and evaluation data 122 and train model B on both the training data 120 and evaluation data 122, for example, and then generate an updated set of weights based on the error ratio of updated model A and updated model B, e.g., and then use that as the hosted model 136. For example, in one embodiment, if the selected model is single model A, training system 150 is to train model A on both the training data 120 and evaluation data 122, e.g., and then use that as the hosted model 136. In certain embodiments, the selected model 308 is incrementally trained by model training service 132 on the evaluation data 122 (e.g., but not the training data 120). Hosted model 136 may then be used for an inference (e.g., prediction).

In certain embodiments, the machine learning service allows the user to see which model(s) were selected for use. In certain embodiments, the machine learning service does not allow a user to see which model(s) were selected for use. In certain embodiments, a user interface includes a list of the candidate models that the user can select to use as candidate models in the selection of selected model 308. In one embodiment, a user is to upload their model to the service as a candidate model.

A single model may include weights within that single model that are separate from the weights assigned each model in an aggregated model. In certain embodiments, the weights within an individual model may be from: the evaluation (e.g., error) metrics from validation, Akaike information criterion (AIC), Bayesian information criterion (BIC), dynamic weights, random weights, or any combination thereof. In certain embodiments, the weights assigned each model in an aggregated model may from the average evaluation (e.g., error) metrics, weighted evaluation (e.g., error) metrics, or exponentially weighted evaluation (e.g., error) metrics. In one embodiment, an exponential scale of the weight is used to distinguish one model from another (e.g., where the exponential scale penalizes the models that have performance below a threshold).

Using only one machine learning model does not necessarily reveal significant information from the training data. An aggregated model (e.g., ensemble of models) can be used to improve the performance of a model, e.g., for forecasting. By combing different individual models, certain embodiments herein generate a plurality of aggregated models, e.g., C(N, 1) + C(N, 2) + C(N, 3) + ... + C(N, N). In certain embodiments, validation is performed on each of the aggregated models to generate each's accuracy and error metrics. Thus, in certain embodiments, the selection of the number of individual models (N) controls how many aggregated models are generated. In one embodiment, N is 2, 3, 4, or 5 (or any other positive integer). The aggregated models may not outperform a single individual model based on the machine learning task and sample dataset, so the service to select one of the single or aggregated models as the model used for the final prediction(s).

The process above may be triggered based on detecting an event, e.g., detecting new user data (e.g., new data 118) or if performance of the selected model is below a threshold performance (e.g., an error rate is exceeded).

Figure 4:
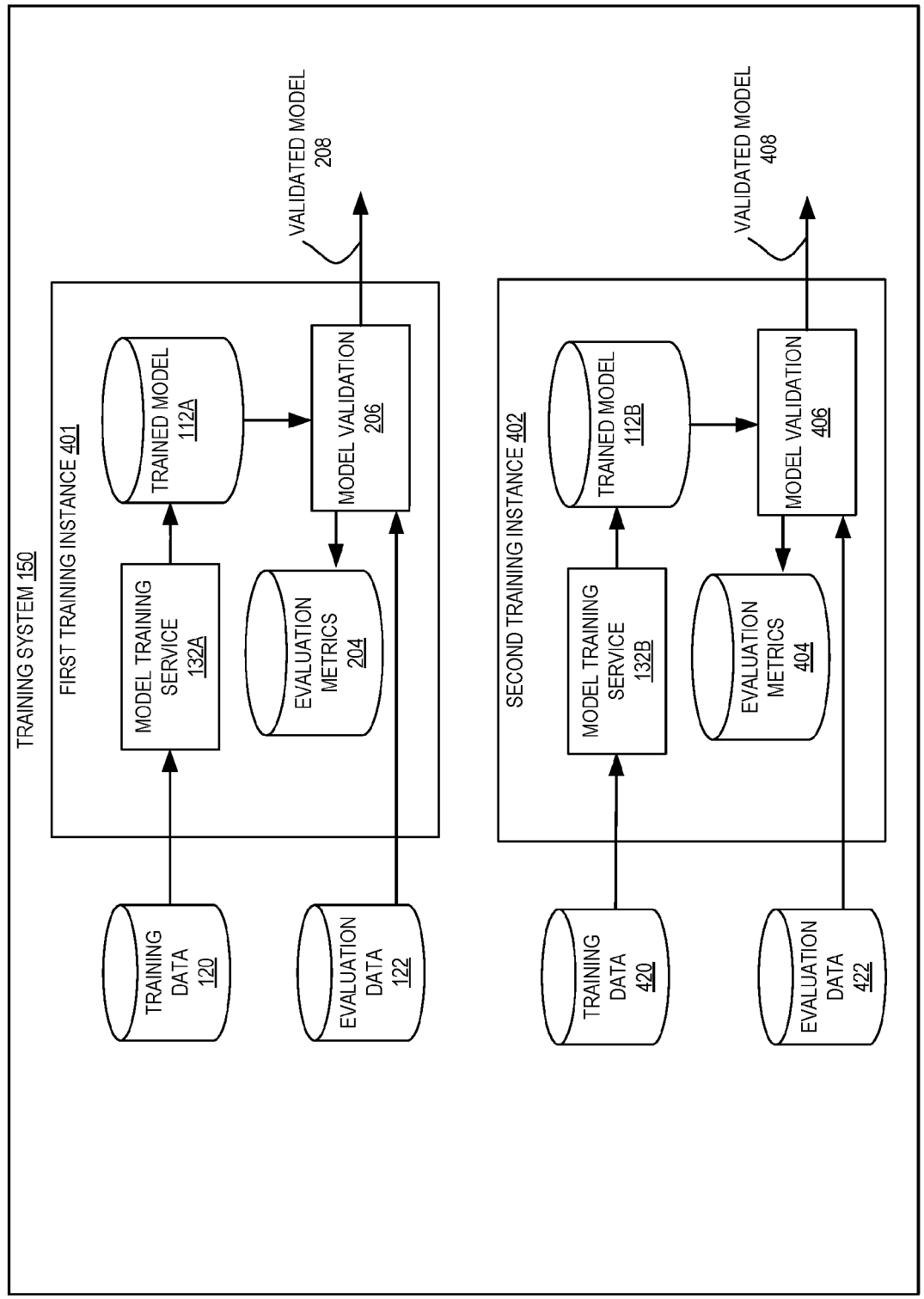
FIG. 4 is a diagram illustrating a custom model system that includes a plurality of parallel training instances according to some embodiments.

FIG. 4 is a diagram illustrating a custom model system 108 that includes a plurality of parallel training instances (401, 402) according to some embodiments. In FIG. 4, first training instance 401 is to train one or more of a plurality of candidate models by model training service 132A. Optionally, a user may indicate a request that the custom model system 108 is to determine one or more candidate models for training, e.g., determined by candidate model selection service 133 discussed in reference to FIGS. 1 and 2. Model validation 206 may be performed on a candidate model (e.g., one of model A, model B, or model C). In one embodiment, model validation 206 takes a known input from evaluation data 122, generates an inference based on that input, and compares the predicted data (e.g., output of the model) with the known (e.g., actual) data from evaluation data 122 for that input, and generates evaluation metrics 204. This model validation performed may be cross validation. The evaluation metrics may be an error ratio, e.g., the mean squared error, root mean squared error, mean absolute percentage error, etc. In certain embodiments, model validation 206 is to select if a trained model 112A is to be passed on as a validated model 208. In one embodiment, first training instance 401 is to exclude models below a threshold (e.g., performance) value from being validated models 208. In one embodiment, first training instance 401 is to include any (e.g., explicitly) user specified models as a validated model 208 (e.g., independent of the model's performance). Trained model (e.g., validated model 208) may then be used to form one or more aggregated models.

In FIG. 4, second training instance 402 is to train one or more of a plurality of candidate models by model training service 132B. Optionally, a user may indicate a request that the custom model system 108 is to determine one or more candidate models for training, e.g., determined by candidate model selection service 133 discussed in reference to FIGS. 1 and 2. Model validation 406 may be performed on a candidate model (e.g., one of model A, model B, or model C). In one embodiment, model validation 406 takes a known input from evaluation data 422, generates an inference based on that input, and compares the predicted data (e.g., output of the model) with the known (e.g., actual) data from evaluation data 422 for that input, and generates evaluation metrics 404. This model validation performed may be cross validation. The evaluation metrics may be an error ratio, e.g., the mean squared error, root mean squared error, mean absolute percentage error, etc. In certain embodiments, model validation 406 is to select if a trained model 112B is to be passed on as a validated model 408. In one embodiment, second training instance 402 is to exclude models below a threshold (e.g., performance) value from being validated models 408. In one embodiment, second training instance 402 is to include any (e.g., explicitly) user specified models as a validated model 408 (e.g., independent of the model's performance). Trained model (e.g., validated model 408) may then be used to form one or more aggregated models (e.g., validated models 208, 408 being input into weight service 302 in FIG. 3). Training data 420 may be a copy of training data 120 and evaluation data 422 may be a copy of evaluation data 122.

Although two training instances 401, 402 are shown, it should be understood that there may be three or more training instances. In one embodiment, the plurality of training instances (e.g., 401, 402) are executed in parallel.

Figure 5:
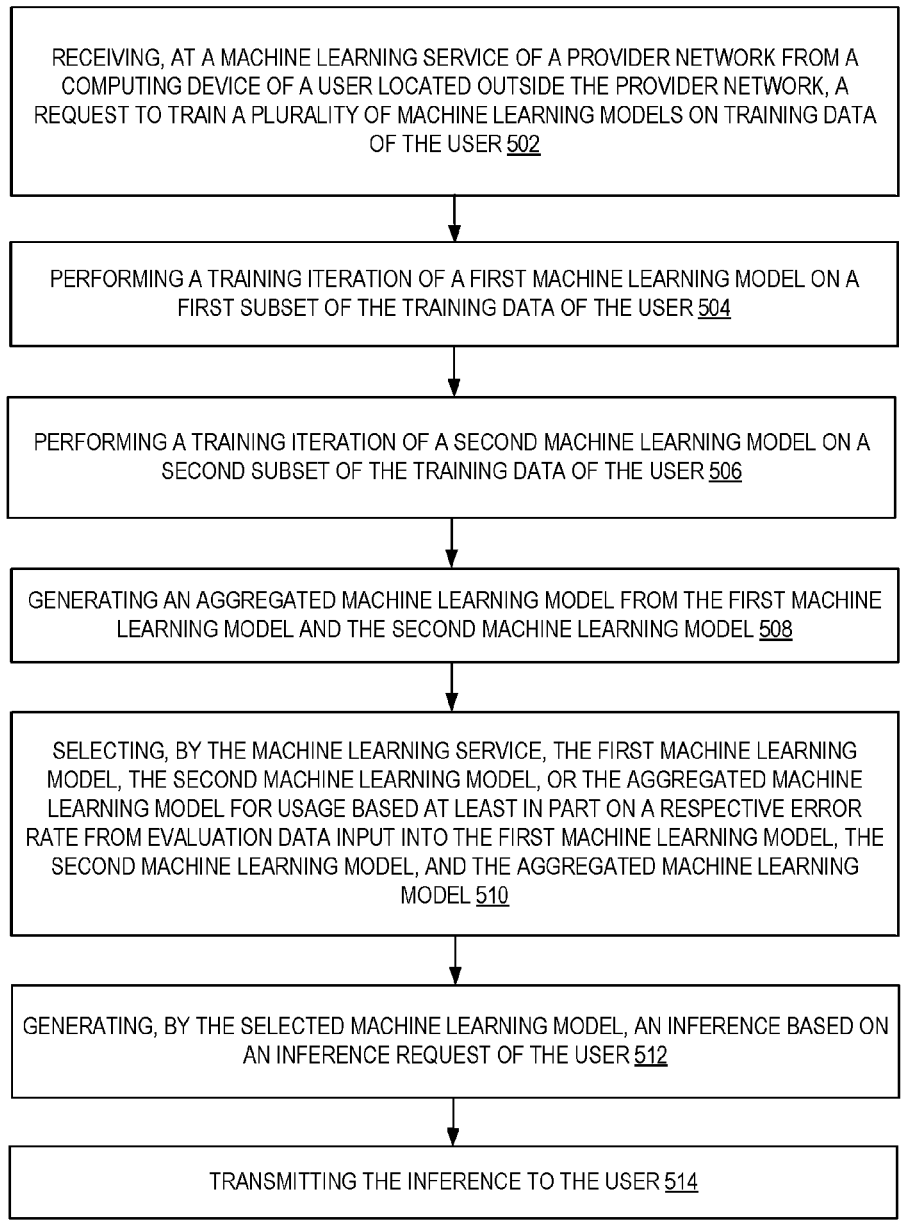
FIG. 5 is a flow diagram illustrating operations of a method for generating an aggregated machine learning model from a first machine learning model and a second machine learning model, selecting the first machine learning model, the second machine learning model, or the aggregated machine learning model for usage, and performing an inference with the selected machine learning model according to some embodiments.

FIG. 5 is a flow diagram illustrating operations 500 of a method for generating an aggregated machine learning model from a first machine learning model and a second machine learning model, selecting the first machine learning model, the second machine learning model, or the aggregated machine learning model for usage, and performing an inference with the selected machine learning model according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by provider network 100 of the other figures.

The operations 500 include, at block 502, receiving, at a machine learning service of a provider network from a computing device of a user located outside the provider network, a request to train a plurality of machine learning models on training data of the user. The operations 500 further include, at block 504, performing a training iteration of a first machine learning model on a first subset of the training data of the user. The operations 500 further include, at block 506, performing a training iteration of a second machine learning model on a second subset of the training data of the user. The operations 500 further include, at block 508, generating an aggregated machine learning model from the first machine learning model and the second machine learning model. The operations 500 further include, at block 510, selecting, by the machine learning service, the first machine learning model, the second machine learning model, or the aggregated machine learning model for usage based at least in part on a respective error rate from evaluation data input into the first machine learning model, the second machine learning model, and the aggregated machine learning model. The operations 500 further include, at block 512, generating, by the selected machine learning model, an inference based on an inference request of the user. The operations 500 further include, at block 514, transmitting the inference to the user.

Figure 6:
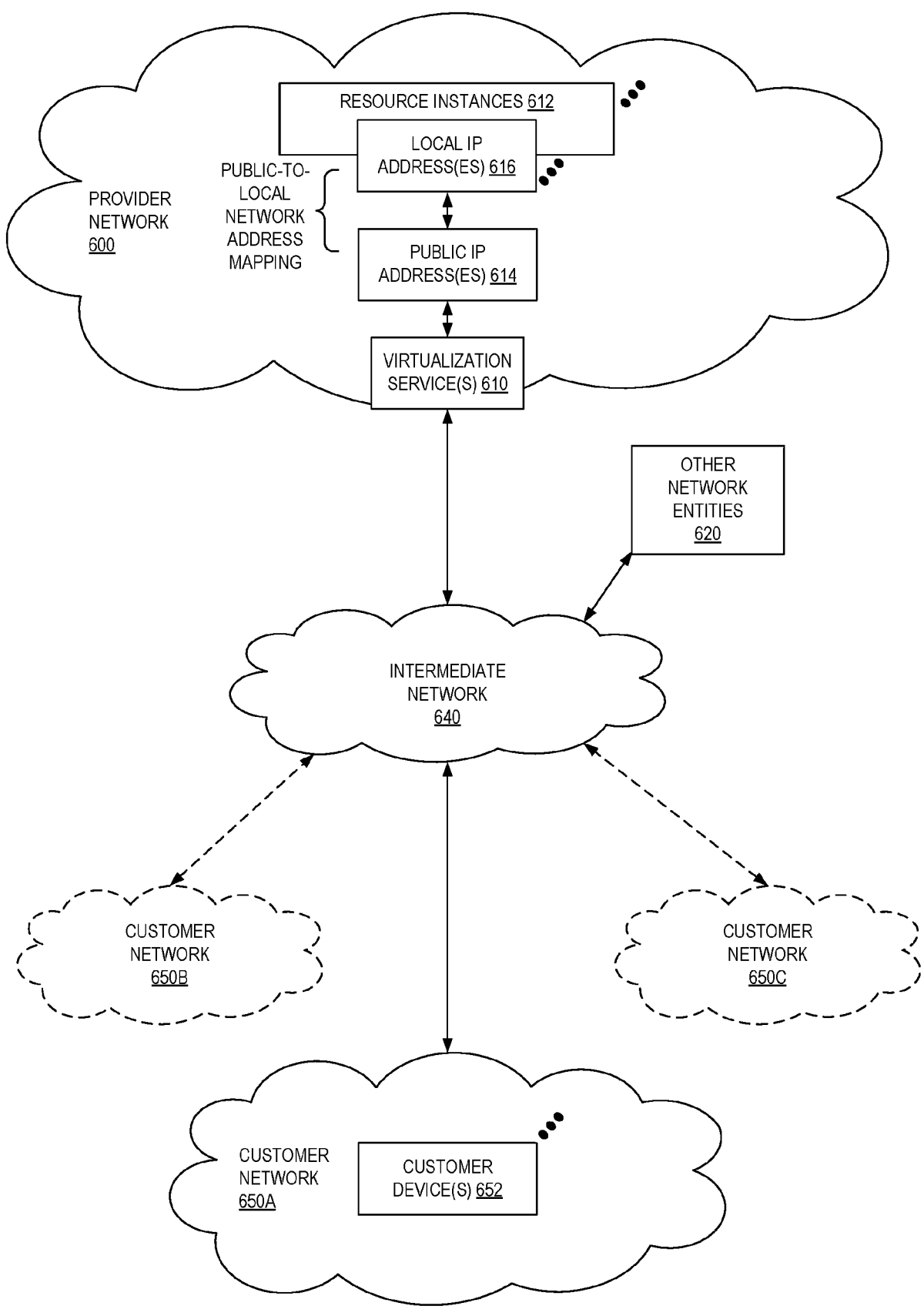
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
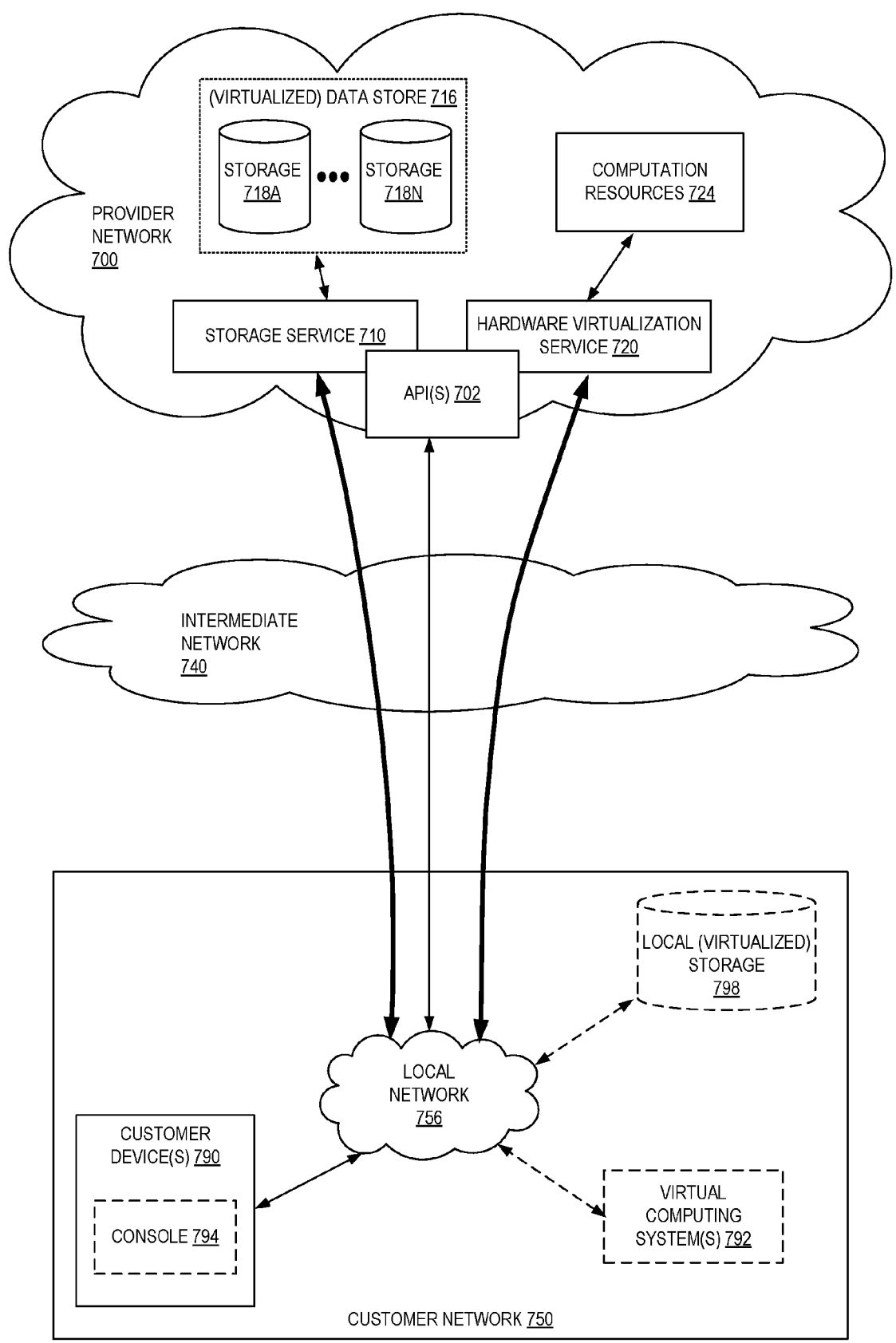
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
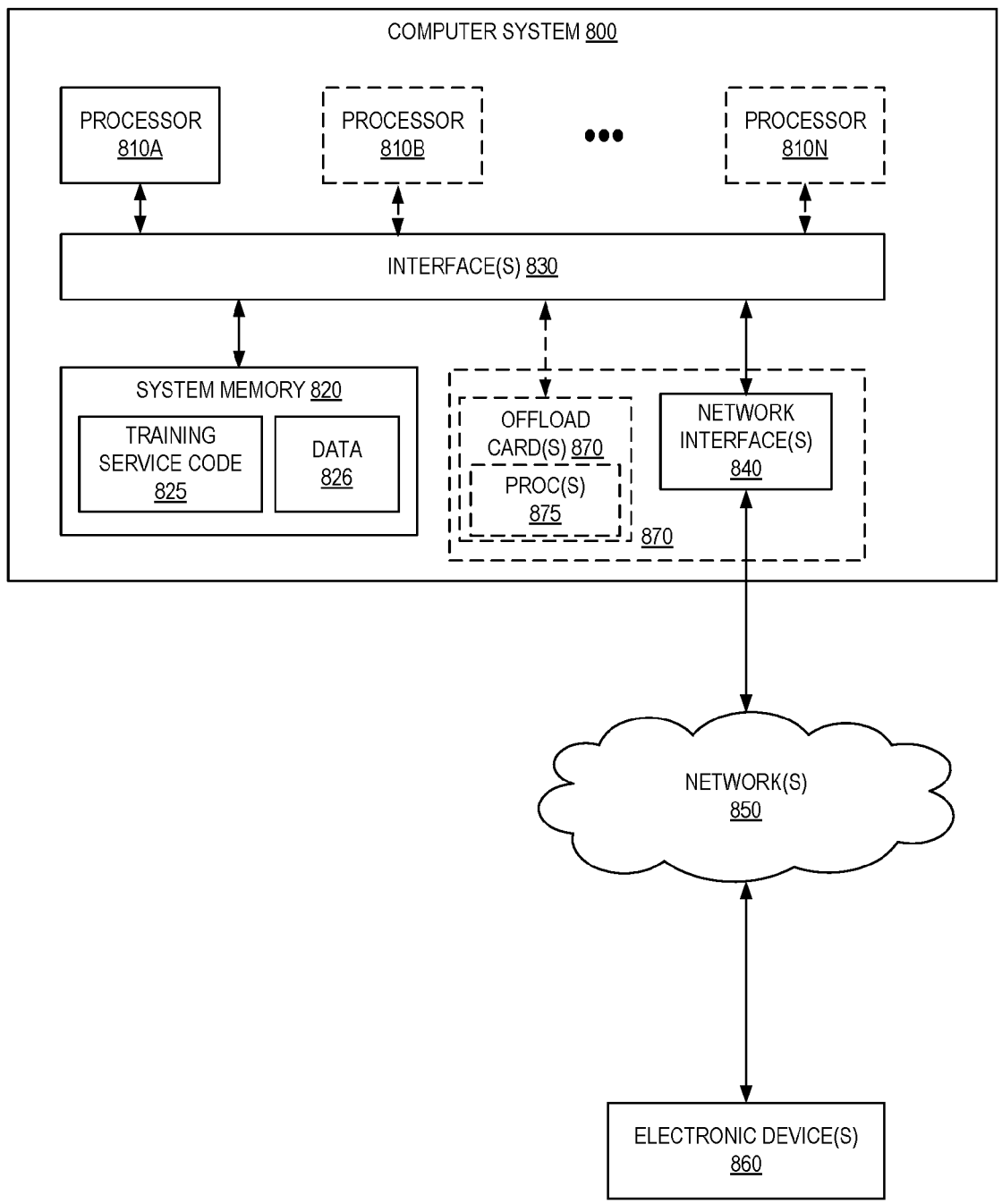
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as training service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect - Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol / Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a machine learning service of a provider network from a computing device of a user located outside the provider network, a request to train a plurality of machine learning models on training data of the user;
   performing a training iteration of a first machine learning model on a first subset of the training data of the user;
   performing a training iteration of a second machine learning model on a second subset of the training data of the user;
   generating an aggregated machine learning model from the first machine learning model and the second machine learning model;
   selecting, by the machine learning service, the first machine learning model, the second machine learning model, or the aggregated machine learning model for usage based at least in part on a respective error rate from evaluation data input into the first machine learning model, the second machine learning model, and the aggregated machine learning model;
   generating, by the selected machine learning model, an inference based on an inference request of the user; and
   transmitting the inference to the user.

2. The computer-implemented method of claim 1, wherein the user selects a first algorithm for the first machine learning model and a second algorithm for the second machine learning model as candidates for training.

3. The computer-implemented method of claim 1, further comprising selecting, by the machine learning service, an algorithm for the first machine learning model as a candidate for training from a plurality of algorithms.

4. A computer-implemented method comprising:
   receiving, at a machine learning service of a provider network, a request to train a plurality of machine learning models on training data;
   performing a training iteration of a first machine learning model on a first subset of the training data;
   performing a training iteration of a second machine learning model on a second subset of the training data;
   generating an aggregated machine learning model from the first machine learning model and the second machine learning model;
   selecting the first machine learning model, the second machine learning model, or the aggregated machine learning model for usage based at least in part on a respective error rate for an input of evaluation data;
   generating, by the selected machine learning model, an inference based on an inference request; and
   transmitting the inference to a client application or to a storage location.

5. The computer-implemented method of claim 4, further comprising a user selecting a first algorithm for the first machine learning model as a candidate for training.

6. The computer-implemented method of claim 5, further comprising selecting, by the machine learning service, a second algorithm for the second machine learning model as a candidate for training from a plurality of algorithms.

7. The computer-implemented method of claim 4, further comprising selecting, by the machine learning service, a first algorithm for the first machine learning model as a candidate for training from a plurality of algorithms.

8. The computer-implemented method of claim 4, wherein the generating the aggregated machine learning model comprises providing a first weight for the first machine learning model and a second weight for the second machine learning model.

9. The computer-implemented method of claim 8, wherein the first weight and the second weight are based at least in part on a respective error ratio determined for the evaluation data that is input into the first machine learning model and the second machine learning model.

10. The computer-implemented method of claim 4, further comprising:
    performing a training iteration of a third machine learning model on a third subset of the training data;
    generating a second aggregated machine learning model from the first machine learning model and the third machine learning model;
    generating a third aggregated machine learning model from the second machine learning model and the third machine learning model; and
    generating a fourth aggregated machine learning model from the first machine learning model, the second machine learning model, and the third machine learning model,
    wherein the selecting comprises selecting the first machine learning model, the second machine learning model, the first machine learning model, the aggregated machine learning model, the second aggregated machine learning model, the third aggregated machine learning model, or the fourth aggregated machine learning model for usage based at least in part on a respective error rate for an input of the evaluation data.

11. The computer-implemented method of claim 4, further comprising, before generating the inference, performing a training iteration of the selected machine learning model on the training data and the evaluation data.

12. The computer-implemented method of claim 4, further comprising, before generating the inference, performing an incremental training iteration of the selected machine learning model on the evaluation data and not the training data.

13. The computer-implemented method of claim 4, further comprising receiving updated training data, wherein the receiving the updated training data triggers:
- performing a second training iteration of the first machine learning model on a first subset of the updated training data;
- performing a second training iteration of the second machine learning model on a second subset of the updated training data;
- generating an updated aggregated machine learning model from the first machine learning model and the second machine learning model;
- selecting the first machine learning model, the second machine learning model, or the updated aggregated machine learning model for usage based at least in part on a respective error rate for an input of evaluation data;
- generating, by the selected machine learning model, a second inference; and transmitting the second inference to the client application or to the storage location.

14. The computer-implemented method of claim 4, further comprising triggering a restart of the performing through the transmitting when performance of the selected machine learning model falls below a threshold value.

15. A system comprising:
- a first one or more electronic devices to implement a storage service in a multi-tenant provider network to store training data and evaluation data; and
- a second one or more electronic devices to implement a machine learning service in the multi-tenant provider network, the machine learning service including instructions that upon execution cause the machine learning service to perform operations comprising:
  - receiving a request to train a plurality of machine learning models on the training data,
  - performing a training iteration of a first machine learning model on a first subset of the training data,
  - performing a training iteration of a second machine learning model on a second subset of the training data,
  - generating an aggregated machine learning model from the first machine learning model and the second machine learning model,
  - selecting the first machine learning model, the second machine learning model, or the aggregated machine learning model for usage based at least in part on a respective error rate for an input of the evaluation data,
  - generating, by the selected machine learning model, an inference based on an inference request, and
  - transmitting the inference to a client application or to a storage location.

16. The system of claim 15, wherein the operations further comprise selecting, by the machine learning service, a first algorithm for the first machine learning model as a candidate for training from a plurality of algorithms.

17. The system of claim 15, wherein the generating the aggregated machine learning model comprises providing a first weight for the first machine learning model and a second weight for the second machine learning model.

18. The system of claim 17, wherein the first weight and the second weight are based at least in part on a respective error ratio determined for the evaluation data that is input into the first machine learning model and the second machine learning model.

19. The system of claim 15, wherein the operations further comprise:
- performing a training iteration of a third machine learning model on a third subset of the training data;
- generating a second aggregated machine learning model from the first machine learning model and the third machine learning model;
- generating a third aggregated machine learning model from the second machine learning model and the third machine learning model; and
- generating a fourth aggregated machine learning model from the first machine learning model, the second machine learning model, and the third machine learning model,
- wherein the selecting comprises selecting the first machine learning model, the second machine learning model, the first machine learning model, the aggregated machine learning model, the second aggregated machine learning model, the third aggregated machine learning model, or the fourth aggregated machine learning model for usage based at least in part on a respective error rate for an input of the evaluation data.

20. The system of claim 15, wherein the operations further comprise, before generating the inference, performing an incremental training iteration of the selected machine learning model on the evaluation data and not the training data.

* * * * *